United States Patent [19]

Meyer

[11] Patent Number: 5,421,650
[45] Date of Patent: Jun. 6, 1995

[54] MIXING MACHINERY OF THE TRANSFERMIX TYPE

[76] Inventor: Paul Meyer, Apt. 23, Res. Tiziana, Via Locarno 27b, CH-6612, Ascona, Switzerland

[21] Appl. No.: 73,859

[22] Filed: Jun. 8, 1993

[30] Foreign Application Priority Data

Sep. 6, 1992 [GB] United Kingdom ............... 9212155

[51] Int. Cl.$^6$ .................................................. B29B 7/42
[52] U.S. Cl. ........................................ 366/88; 366/89; 366/323; 366/339; 425/208
[58] Field of Search ................ 366/79, 81, 88–90, 366/96–99, 318, 321, 323, 338, 339, 69; 425/208, 209; 100/145, 146

[56] References Cited

U.S. PATENT DOCUMENTS

| Re. 26,147 | 1/1967 | Parshall et al. | 366/89 X |
| 1,904,884 | 4/1933 | Royle | 366/323 X |
| 3,102,716 | 9/1963 | Frenkel | 366/89 X |
| 3,164,375 | 1/1965 | Frenkel | 366/89 X |
| 4,136,969 | 1/1979 | Meyer | 425/208 X |
| 4,184,772 | 1/1980 | Meyer | 366/88 X |
| 4,779,989 | 10/1988 | Barr | 425/208 |
| 4,884,894 | 12/1989 | Hashimoto et al. | 366/338 |

FOREIGN PATENT DOCUMENTS 1260216 9/1986 U.S.S.R. .......................... 366/88

*Primary Examiner*—David A. Scherbel
*Assistant Examiner*—Charles Cooley
*Attorney, Agent, or Firm*—Russell W. Warnock; Alan A. Csontos

[57] ABSTRACT

An apparatus for extruding material is provided which includes a barrel and a screw. The barrel has an axis and an internal operating surface, the internal operating surface defining a barrel interior and a barrel helical thread portion which includes a plurality of grooves reducing in cross-sectional area from a maximum value to a minimum value in a direction axially opposite to the axial direction of flow of material through the barrel. The screw has an external operating surface and extending into the barrel interior, the external operating surface of the screw forming a screw helical thread portion having at least a first and second groove. Each of the first and second grooves has an upstream end, a downstream end, and a body portion extending between the upstream and downstream ends thereof, the first and second grooves being axially co-incident at at least a transition location and being at least partially axially co-extensive. The internal operating surface of the barrel and the external operating surface of the screw together form a passage for the flow of material therethrough in which the material is transferred between the first and second grooves of the screw helical thread portion and the grooves of the barrel helical thread portion with material being advanced in the first groove of the screw helical thread portion being transferred at a different rate to the grooves of the barrel helical thread portion than material being advanced in the second groove of the screw helical thread portion.

6 Claims, 2 Drawing Sheets

MIXING MACHINERY OF THE TRANSFERMIX TYPE

BACKGROUND OF THE INVENTION

This invention relates to machinery for mixing, working, homogenizing and/or compounding a flowable medium by itself or with others and/or with solids, liquids or gases. It is particularly though not exclusively concerned with plastifyable visco-elastic materials such as rubber and meltable materials such as plastics.

Continuously operating mixing apparatus is known with what has become accepted in the art as a Transfermix geometry, generically defined in B.P. No. 842'692 as:

Apparatus comprising a component having an internal operating surface provided wish a helical thread and an interior component having an external operating surface provided with a helical thread of a different direction but coaxial with the said helical thread on said component having said internal operating surface, the said helical threads facing one another and defining a passage for a medium to be mixed; the envelope defined by the crown of the said interior thread being within the envelope defined by the crown of the said exterior thread up to and including coincidence of the said envelopes, and the cross-sectional areas of the grooves of the said facing threads varying in opposite senses between a maximum and a minimum value for of each of the said threads along substantially the same length of the said passage; whereby when in operation the said medium is caused to move in the said passage, portions thereof are transferred successively between the grooves of the said facing helical threads as giver and taker.

Such apparatus may be stationary and the medium may be pumped.

In such apparatus, the minimum values of groove cross sectional area may be zero, and the said threads may be of opposite hand.

Continuously operating extruders are known in which a rotor and a barrel form an inlet-section, a Transfermix section and an exit-section, the said rotor having said external helical thread and the barrel having in the said Transfermix section the said internal helical thread of opposite hand but coaxial with the helical thread on the rotor, the thread in the one component e.g. the rotor varying from a full-cross-section to zero-cross-section over the axial length of the Transfermix section while the thread in the other component (e.g. the barrel) varies from zero-cross-section to full-cross-section, and vice versa in a possibly following Transfermix section.

In operation, the material being transported in the one component at the entry of this Transfermix section is transferred layer-by-layer from this as the giver-component to the taker component until by the end of the mixing section, all the material will have been transferred, mixed and worked transversely, layer by layer in orderly sequence.

Two generations of such Transfermix are described in GB Patents Nos. 842'692; (Frankel) and Nos. 1'585'531 and 1'585'532 (Meyer).

Such Transfermix have been applied to the mixing and extrusion of rubber compounds, plastics and of various viscous substances in Chemical Engineering in each case providing superior performance in transverse or cross-sectional mixing. This has meant that care had to be taken that all she ingredients to be mixed were present in the required proportion in each cross-section of the annular flow that was presented at the entry to the Transfermix section, if uniformity to a required degree was to be achieved at the exit from such a Transfermix section.

This has necessitated preparation in a preceding blending operation to the standard of equal proportioning required, whereas frequently a degree of longitudinal mixing incorporated with the cross-wise mixing would do away with some or all of such preparation.

An example of such a requirement for rubber mixing is in a Transfermix as a dump-extruder following an Internal Batch Mixer of a Banbury or equivalent type, as are generally installed in the Rubber Industry as primary mixers. The mixing cycle-time in such an Internal Mixer could generally be reduced considerably if a Transfermix hot-fed dump extruder had longitudinal as well as cross-wise mixing capacity.

This would make possible the upgrading of existing Internal Mixer lines which generally at this time have either mill-trains following them, for further mixing without additional heating-up, or simple, non-mixing dump-extruders for shaping the mix into sheet or pellets for subsequent cooling. To achieve the necessary mixing for many compounds, two or more mixing cycles through the installation are needed.

There are also requirements for longitudinal mixing in cold-fed Transfermix, in order to simplify a preparation of the feed or to eliminate such preparation altogether.

Transfermix for the Rubber and Plastics Industry have generally been conceived as extruders with a driven rotor and a stationary barrel and have not exceeded diameters of 24/21" or 610/530 mm with rotational speeds of 3-12 r.p.m., necessitating very large and costly gear-trains.

However, for the Earth, Chemical and Metallurgical Industries having to deal with large lumps of earth or filtercake, Transfermix have been conceived with diameters of a bigger order of magnitude, say 1000 to 3000 mm upwards. In these, the internal component would be stationary and an outer one (barrel) would be driven in the manner of a rotary kiln at low speed, and having either a horizontal or a vertical axis.

The drives of such devices would be simpler than the gear-boxes usual for extruders in that a gear-ring of large diameter fitted around the outside of the barrel would be driven by a standard gear motor. Any bigger powers required could easily be accomodated by arranging more such standard gear motors around the circumference.

Hot-fed Transfermix having also longitudinal mixing capacity conceived with rotated barrels of larger diameters and simplified drives as for kilns could be utilized as dump-extruders after Internal Mixers in the Rubber and Plastics industry.

A very crude comparison of the cooling surface available on even the biggest mills (84" length×26"φ or 2,100 mm length×665 mm ), taking twice the area of the banded roll as the effective cooling area (the outside radiating off heat) will show that, for example, a 1,500 mm mean diameter Transfermix of 1,500 mm effective length will have more cooling surface than two 84" mills in sequence. Such a Transfermix of 3,000 mm length will be able to exert correspondingly more cooling.

This opens up the prospect of using dump-Transfermix under Internal Mixers which like or better than mill-trains apply cooling as well as mixing, where it is known that the lower the temperature of the mix the better will be the quality of the mixing in respect of incorporation of fillers such as carbon-black.

SUMMARY OF THE INVENTION

It is therefore an object of this invention:

In continuously operating Transfermix type cross-sectional or transverse mixers of a stationary type, with the medium to be mixed being pumped through, to provide additionally a longitudinal mixing capacity.

In continuous 'cold-fed' Transfermix-lines, requiring plasticization and/or melting of the feed, to simplify a preliminary blending operation of components of the said feed or altogether to cut out such a preblending stage, so that components could be fed continuously, or batch-wise at reasonably regular intervals, still correctly proportioned over given periods of time, directly into the Transfermix.

In mixing lines involving batch-mixers periodically dumping into Transfermix hot fed extruders, to provide such additional longitudinal mixing, firstly, in order to reduce the cycle-times of such batch-mixers for a given quality of mixing a the end of the line; and/or secondly to reduce the number of passes through such a line, as exemplified by a Rubber Mill-Room.

Additionally, to provide Transfermix of altogether larger diameters than hitherto usual, having simplified drives and sufficient cooling surface in short lengths to provide equal or better cooling effects than mill-trains.

Such Transfermix to be accomodable on vertical instead of horizontal axes to provide also simplified feeding of lumps over conventional extruders which generally need ram-feeders or other feed-aids.

In order to attain these objectives, this invention provides:

Transfermix comprising a component having an internal operating surface provided with a helical thread and an interior component having an external operating surface provided with a helical thread of a different direction but coaxial with the said helical thread on said component having said internal operating surface, the said helical threads facing one another and defining a passage for a medium to be mixed; the envelope defined by the crown of the said interior thread being within the envelope defined by the crown of the said exterior thread up to and including coincidence of the said envelopes, and the cross-sectional areas of the grooves of the said facing threads varying in opposite senses between a maximum and a minimum value for of each of the said threads along substantially the same length of the said passage; characterized in that the helical thread of which the groove-cross-section is being reduced comprises at least two starts of which one over a part of the said axial length is reduced in groove cross-section at a lesser rate than the other is so reduced and over a different part of the said axial length said first start is reduced in its groove cross-sectional area at a faster rate than the said other is so reduced, whereby when in operation the said medium is caused to move in the said passage, portions thereof are transferred between the grooves of the said facing helical threads as giver and taker, with some portions in the initially more slowly-reducing start of the giver-groove being transferred into the taker-groove later than some portions in the said other start of the giver-groove, whereby over the said axial length of Transfermix geometry a measure of longitudinal mixing is effected in addition to the transverse mixing.

In such Transfermix apparatus, the said second start of the said giver helical grooves may additionally be reduced in groove-cross-sectional area at a faster rate at least over the said first partial axial length and may over the remaining axial length be reduced in cross-sectional area at a slower rate.

In such Transfermix apparatus, the slower rates of reduction of the cross-sectional areas of the said two starts over their respective axial lengths may each be zero.

In such Transfermix apparatus, the minimum values of the cross sectional area of facing thread grooves may be zero.

In such Transfermix apparatus, the said facing threads may be of opposite hand.

In such Transfermix, one of the said components may be rotatably mounted and driven to effect an action of transporting the said medium.

In continously operating extruders in which a rotor and a barrel form an inlet-section, a Transfermix section and an exit-section, the said rotor having said external helical thread and the barrel having in the said Transfermix section the said internal helical thread of opposite hand but coaxial with the helical thread on the rotor, the envelopes of the said threads having a radial clearance, the thread in the rotor varying from a full-cross-section to zero-cross-section over the axial length of the Transfermix section while the thread in the barrel varies from zero-cross-section to full-cross-section, and vice versa in a possibly following Transfermix section, this invention provides that the helical thread in a giver-component comprises at least two starts, of which one over a part of the said length of said Transfermix section initially does not reduce in groove-cross-section, while he other said start does so reduce over the said part length, and over a different part length of said Transfermix section retains its minimum groove-cross-section while the first said start reduces in groove-cross-section over said different part-length of the said Transfermix section, and vice versa as between the said rotor and barrel components in a possibly following second Transfermix section. In operation, the material being transported in the rotor at the entry of a first Transfermix section is transferred from this as the giver-component to the barrel as the taker component until by the end of the mixing section, all the material will have been transferred, mixed and worked transversely, while the material in that start of the rotor helix of which the cross-sectional area did not initially reduce will be transferred later than that material which was in that start of the rotor groove which started reducing initially, whereby longitudinal mixing will have been imparted to the said material in addition to the said transverse mixing, and vice versa in a possibly following second Transfermix section.

In embodiments of this invention in which the number of helical starts in a giver component is a multiple of two, such longitudinal displacements of the different rates of reduction in groove-cross-sectional areas and hence of transfer of portions of the medium into the taker component may apply to alternate starts.

In other embodiments of this invention in which the number of helical starts in a giver-component is multiple, such longitudinal displacements of the different rates of the reduction in groove-cross-section may apply sequentially to more than two starts, whereby in operation the transfer of portions of the medium into the taker component may be delayed sequentially, in order to provide longitudinal mixing.

The invention will now be described by way of example and in some detail with reference to the accompanying drawing in which

DETAILED DESCRIPTION OF PREFERRED EMBODIMENT

Figure 1:
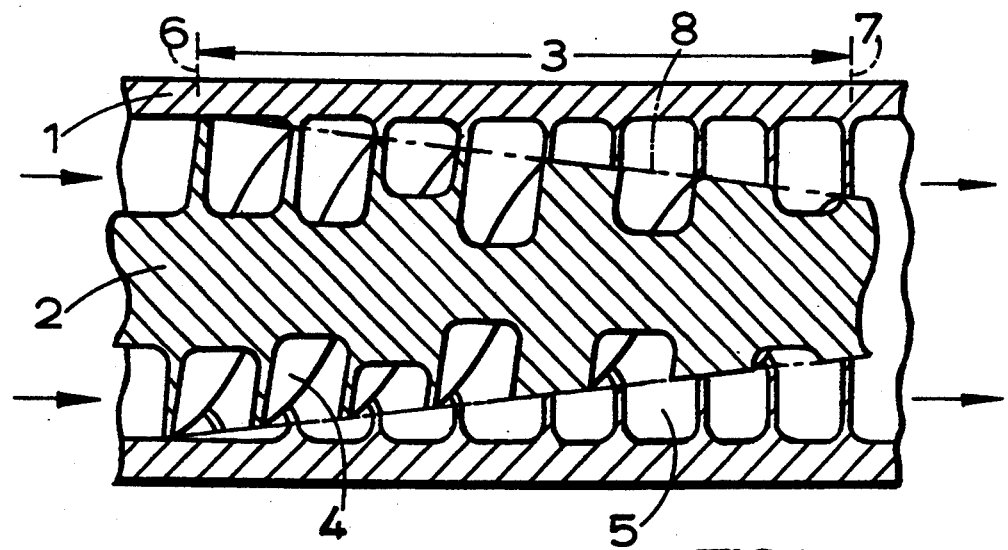
FIG. 1 is a cross-section through a Transfermix zone according to this invention shown diagrammatically, in which the internal and the external components are fixed relative to one another, in an annular conduit for a medium being pumped.

In FIG. 1, an annular conduit 1 with an interior component 2 has a Transfer mixing section 3 according to this invention. In this, the inner component 2 has 4-start helical grooves 4 and the outer component has helical grooves 5, which may be of opposite hand to the inner helix 4, but need not be other than of different pitch.

In accordance with the Transfermix principle, the flow cross sectional area of the inner helices 4 reduces from the beginning 6 along the length of mixing section 3, to zero at its end 7, while the flow cross-sectional area of the outer helices 5 increases from zero at the beginning 6 of the mixing section to full at the end 7. The two components may both be stationary and the two helices may contact each other or may even be fixed each other at their lands, where these cross, the dotted line 8 marking the conical interface between the helices.

In operation, with a medium being pumped through the annular passage,, the contents of the inner helix 4 will be transferred element by element across the interface 8 into the outer helix 5, the inner, reducing helix being the "giver" and the outer, increasing helix being the "taker" in this transfer.

Figure 2:
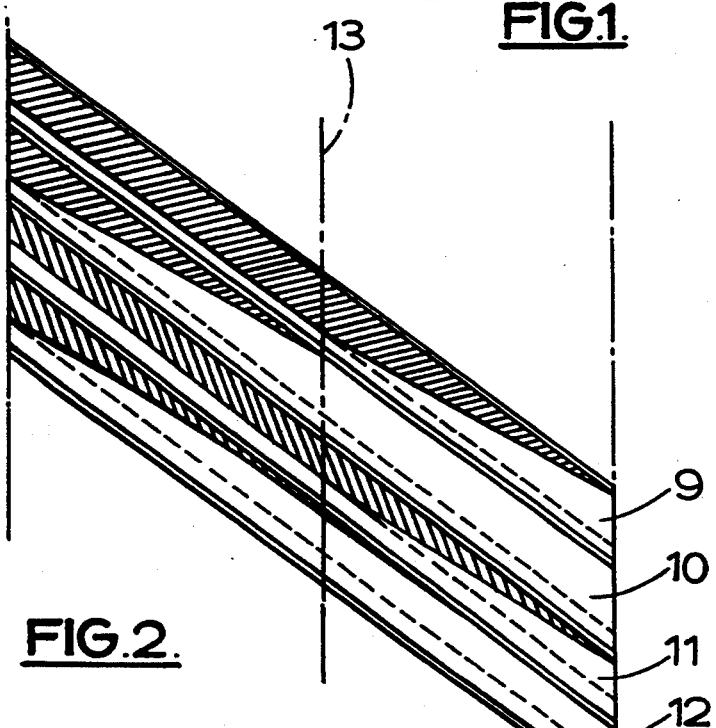
FIG. 2 is a developed view of two adjacent grooves of the internal "giver" component, with the changes of the groove depths being marked in close hatching as a projection into the plane of the drawing.

FIG. 2 shows a developed view of 4 starts 9, 10 11 and 12 of the giver helices 4, with, in each groove, the change of groove-depth being indicated in projection into the plane of the drawing by the closely cross-hatched areas.

In accordance with this invention, the depth of grooves 9 and 11 are reduced at a lower rate than those of grooves 10 and 12 between the beginning 6 and a transition location or intermediate section 13, while from 13 to the end-section 7 the depths of grooves 10 and 12 are reduced at a faster-rate than those of grooves 9 and 11. In fact, grooves 9 and 10 show the extreme case in that groove 9 remains at full depth from 6 to 13 while groove 10 reduces from full depth to zero and from 13 to 7 groove 9 remains at zero depth while groove 10 reduces from full depth to zero.

Grooves 11 and 12 show a gradual change in the groove-depths, in groove 11 this being very slow between 6 and 13 and proceeding at a much faster rate between 13 and 7. For groove 12, the opposite holds true. These developments of the groove depths are also shown in FIG. 1 for adjacent grooves of the giver-helix 4.

In operation, with a non-homogeneous medium being pumped through this mixing section, from the beginning 6 to section 13 the "giver" helical grooves 12 and 10 respectively will transfer almost or in the extreme case of groove 10 all of their contents into the "taker" grooves while from the grooves 11 and 9 very little or from groove 9 nothing is so transferred. Between section 13 and the end 7, the so far less active grooves 11 and 9 tranfer their flows into the taker grooves while the grooves 12 and 10 take little or no more part in the transfer.

In this way, while a complete mixing action transversely to the main direction of flow in the annular conduit will have taken place in accordance with the generic Transfermix, in addition a clearly defined amount of longitudinal mixing will have been carried out between the lengths 6 to 13 and 13 to 7 of the mixing zone.

As with the transverse mixing, the intensity of this longitudinal intermixing will depend on the number of elements of the Transfer which is determined by the number of crossing-points between the opposite "giver" and "taker" helices, and the "thickness" of the elements, which will be determined by the rates of change of the flow cross-sections of the opposing helical grooves.

It will be seen that by maximizing the number of elements and by minimizing the thickness of elements, practically any intensity of mixing can be achieved for one transfer, or, if required, by repeated transfers with the inner and outer helices changing their roles of "giver" and "taker".

It will be understood that variations in depth of helical grooves are shown only by way of example and as being easier to make clear, but that the invention could also be carried into effect by variations of groove width or by combinations of groove width and groove depth.

Figure 3:
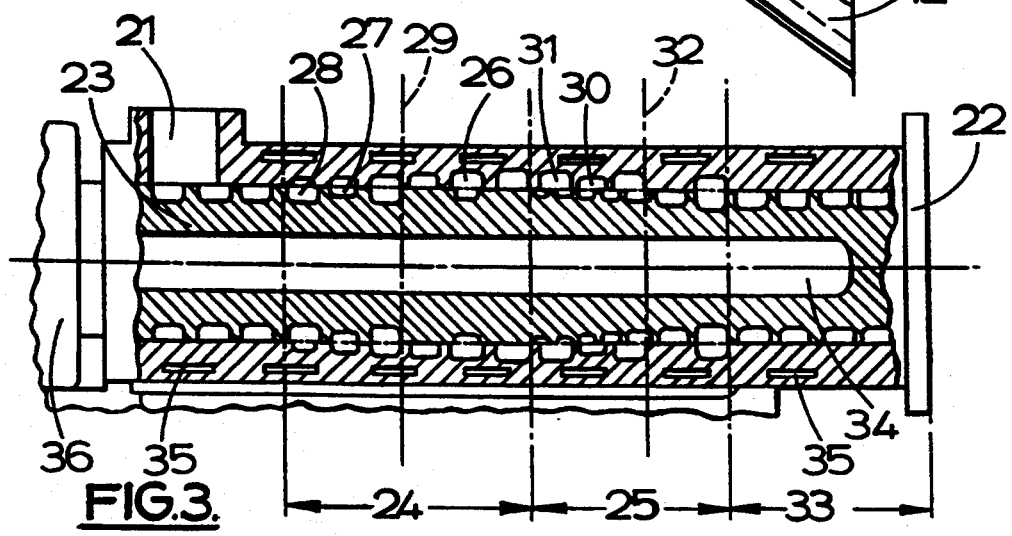
FIG. 3 is a part-sectional elevation of an extruder with two Transfermix-zones according to this invention in series.

FIG. 3 shows an partially sectioned extruder, which could be a cold feed rubber extruder, with a barrel 20 having an inlet 21 and an outlet flange 22.

The extruder screw 23 and the barrel 20 between them form two Transfermix-zones 24 and 25 in sequence. In the zone 24, the screw helices operate as the "giver" into the barrel helices 26 and are shaped in accordance with this invention, with every second helical groove 27 of the screw having reduced from full depth to substantially zero depth up to section 29 halfway into the Transfermix zone 24 while every other helical groove 28 has not reduced in depth up to section 29, with the reverse changes taking place from section 29 up to the end of Transfermix-zone 24.

In Transfermix-Zone 25 the helical grooves in the barrel 20 function as the "giver", with every second groove 30 reducing from full depth to zero between the beginning of Transfermix-zone 25 and section 32 while every other helical groove practically remains at full cross-section, with the reverse changes taking place between section 32 and the end of Transfermix-zone 25.

In this way, longitudinal mixing is carried out in addition to transverse mixing separately in both Transfermix-zones.

Following these, the extruder screw is shown to have a metering section 33 and to be capable of temperature control by circulating liquids in the core 34 in the screw and passages 35 in the barrel. The extruder screw 23 has its bearing and drive indicated at 36.

Figure 4:
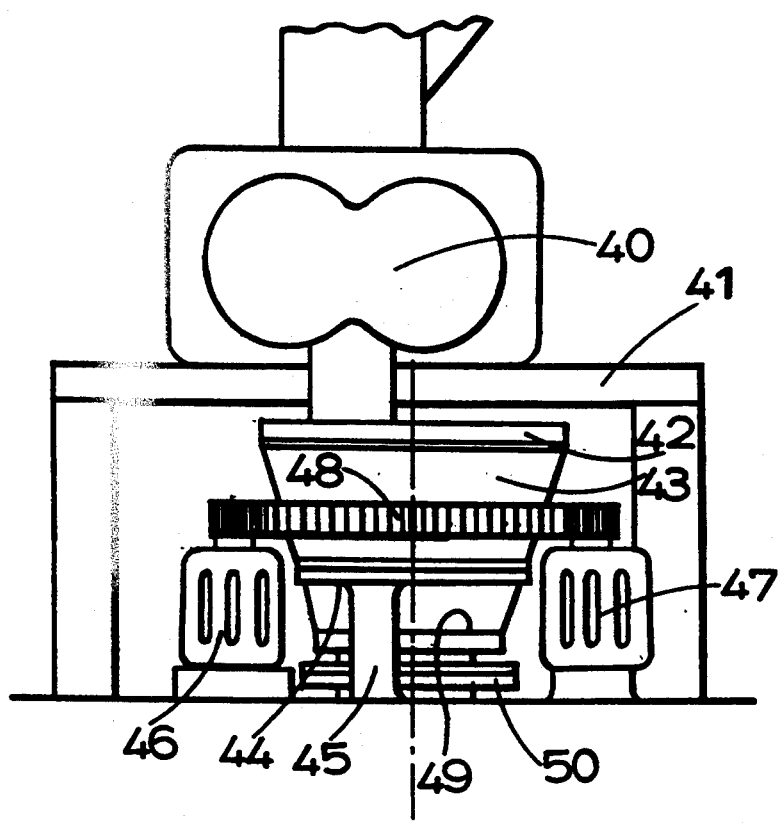
FIG. 4 is a side-elevation of a dump Transfermix extruder on a vertical axis with the outer shell rotatably driven and a fixed inner column, shown positioned under an internal mixer on its stillage.

FIG. 4 shows positioned under an internal mixer 40 on its stillage 41 a Transfermix according to this invention, having an inner stationary column 42 on a vertical axis and an outer rotatable shell 43. The shell is mounted on a bearing 44 carried on supports 45 and driven by geared motors 46 and 47 via the large-diameter gear rim 48, in a manner well known for rotary kilns, both horizontal and vertical, and which provides low rotational speeds without a very costly single gear box. The outlet 49 of the Transfermix is on the lower circumference of the rotary shell 43 and or the central column 42. It may consist of a number of holes arranged round that circumference to extrude pellets which are cut off by knives fixed on the other component. The pellets drop onto a rotary table 50 and may be swept from there to a transport-belt leading to a cooler and/or to a mill for sheeting.

Figure 5:
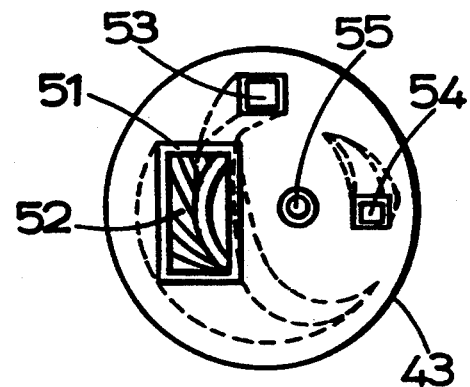
FIG. 5 is a plan view onto the central column of the Transfermix of FIG. 4, without the drive for the rotating shell and the stillage-supports of the internal mixer.

The view in FIG. 5 onto the top of the column 42 shows the opening 51 for the drop-shaft of the internal mixer.

The conically shaped shell 43 has numerous helical grooves 52 on its inside and the opening in the column 42 for the drop of the internal mixer is shaped that its downward and round sloping smooth walls push the lump of rubber against the helices of the rotating shell, thereby making certain of its being drawn into the slot-like opening of the Transfermix proper some distance below.

This measure is designed to enable the ram feeders which, like the gear-box, are another costly and maintenance-intensive feature of dump extruders on a horizontal centre-line, to be dispensed with.

Cooling provisions are not shown, but can easily be accomodated inside the column for circulation under pressure. In view of the large area available, the tempering water on the shell, which would be drilled or made partially hollow for this purpose, could be circulated in an open system, which will eliminate sealing problems.

Also provided at suitable positions on the circumference of the column can be additional inlets 53/54 for curatives in powder form to be incorporated, or a liquid connection 55 leading to outlets spaced round the circumference lower down where the Transfermix would be running full and which would serve the injection of curatives in a suspension or in liquid form fed by a metering pump under pressure.

As stated in the body of the specification, the large mean diameter and relatively small radial depth of the Transfermix having many starts will enable effective cooling and mixing to proceed substantially simultaneously, where the provisions of this invention will ensure the longitudinal mixing still very necessary on the drop from an internal mixer, especially if used at a reduced cycle time, in view of the additional mixing to be done in the Transfermix.

Figure 6:
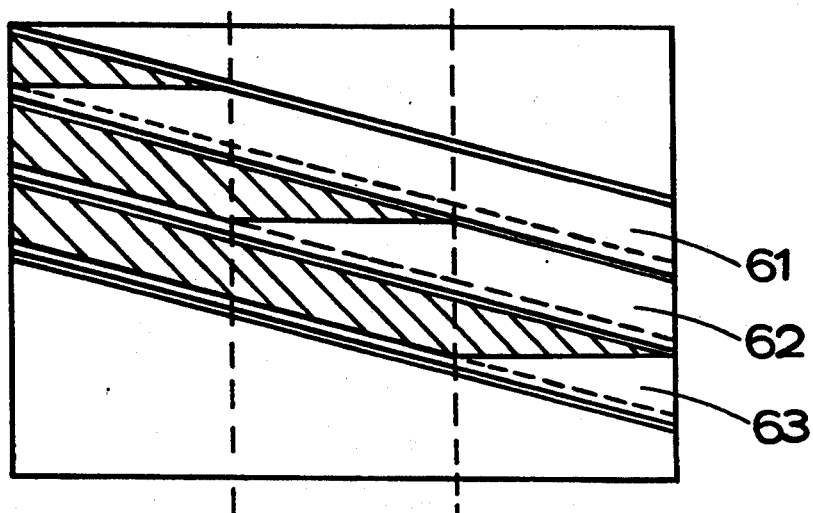
FIG. 6 is a developed view of three helical Grooves of a "giver" component, with the changes in groove-depth being marked in cross hatching as a sideways projection into the plane of the drawing.

FIG. 6 shows, similarly to FIG. 2, a developed view of 3 helical "giver" grooves, 60, 61, 62 in which the provisions of this invention with regard to longitudinal mixing are applied to this group of adjacent grooves.

As shown on the depths of the channels projected into the plane of the drawing and heavily hatched, in the first third of the groove-length, groove 61 reduces from full depth to zero depth while grooves 62 and 63 remain at full depth. In the second third of the length groove 62 reduces from full depth to zero depth while groove 63 remains at full depth and in the last third groove 63 reduces from full depth to zero depth. This will complete the longitudinally spaced transfer of all the contents of the giver-grooves into the taker-grooves which continuously increase in cross-sectional area over the whole length of the Transfermix zone.

The embodiment of FIGS. 4 to 6 may also be utilized for the comminution of waste rubber articles, such as used tires. It has been found that Transfermix apparatus having fairly large clearances between the threads of the relatively movable components can be used for comminution of articles such as tires, resulting in rubber particles of a range of sizes and other components (fibres, wires) being reasonably clean.

I claim:

1. Apparatus for extruding material, comprising:
a barrel having an axis and an internal operating surface, the internal operating surface defining a barrel interior and a barrel helical thread portion which includes a plurality of grooves reducing in cross-sectional area from a maximum value to a minimum value in a direction axially opposite to the axial direction of flow of material through the barrel;
a screw having an external operating surface and extending into the barrel interior, the external operating surface of the screw forming a screw helical thread portion having at least a first and second groove, each of the first and second grooves having an upstream end, a downstream end, and a body portion extending between the upstream and downstream ends thereof, the first and second grooves being axially co-incident at at least a transition location and being at least partially axially co-extensive, the first and second grooves each being of a different pitch than the grooves of the barrel helical thread portion and the cross-sectional area of the first and second grooves reducing from a maximum value to a minimum value in the axial material flow direction with the rate of cross-section reduction of the first groove between its upstream end and the transition location being less than the rate of cross-section reduction of the second groove between its upstream end and the transition location and the rate of cross-section reduction of the first groove between the transition location and its downstream end being greater than the rate of cross-section reduction of the second groove between the transition location and its downstream end, wherein the internal operating surface of the barrel and the external operating surface of the screw together form a passage for the flow of material therethrough in which the material is transferred between the first and second grooves of the screw helical thread portion and the grooves of the barrel helical thread portion with material being advanced in the first groove of the screw helical thread portion being transferred at a different rate to the grooves of the barrel helical thread portion than material being advanced in the second groove of the screw helical thread portion.

2. An apparatus according to claim 1 wherein the rate of cross-sectional reduction of the area of the first groove of the screw helical thread portion along its body portion is less than the rate of cross-sectional reduction of the area of the second groove along its body portion.

3. An apparatus according to claim 2 herein the rate of cross-sectional reduction of the area of the first groove of the screw helical portion has a minimum value of zero.

4. An apparatus according to claim 1 wherein the grooves of the barrel helical thread portion are of opposite hand than the grooves of the screw helical thread portion.

5. An apparatus according to claim 1 and further comprising means to rotably drive the screw.

6. An apparatus according to claim 1 wherein number of grooves of the screw helical portion is a multiple of two.

* * * * *